US007889965B2

United States Patent
Nakagawa

(10) Patent No.: US 7,889,965 B2
(45) Date of Patent: Feb. 15, 2011

(54) OPTICAL DISK APPARATUS

(75) Inventor: Yoshio Nakagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1033 days.

(21) Appl. No.: 11/265,250

(22) Filed: Nov. 3, 2005

(65) Prior Publication Data

US 2006/0093328 A1  May 4, 2006

(30) Foreign Application Priority Data

Nov. 4, 2004  (JP)  ............................ P2004-321055

(51) Int. Cl.
*H04N 5/91*  (2006.01)
(52) U.S. Cl. ...................................................... 386/46
(58) Field of Classification Search .................... 386/46
See application file for complete search history.

(56) References Cited

U.S. PATENT DOCUMENTS 7,185,283 B1 *  2/2007  Takahashi ................... 715/723

2001/0046368 A1 * 11/2001 Tada et al. .................... 386/46
2004/0008284 A1 *  1/2004 Kim ............................ 348/699
2004/0141724 A1 *  7/2004 Nara et al. .................... 386/83

FOREIGN PATENT DOCUMENTS

JP    A-11-184867    *  7/1999
JP    A-2001-283570     10/2001

* cited by examiner

*Primary Examiner*—Peter-Anthony Pappas
*Assistant Examiner*—Asher Khan
(74) *Attorney, Agent, or Firm*—Morgan, Lewis & Bockius LLP

(57) ABSTRACT

An optical disk apparatus for recording information on an optical disk or for reproducing information recorded on an optical disk, wherein previews corresponding to respective titles or chapters of information recorded on an optical disk are displayed and reproduced on a display device. The apparatus includes: a system controller which compares a target title or chapter with a comparison reference title or chapter during reproduction of a preview corresponding to the target title or chapter, and skips common scenes and reproduces subsequent information when the target title or chapter and the comparison reference title or chapter have common scenes.

8 Claims, 4 Drawing Sheets

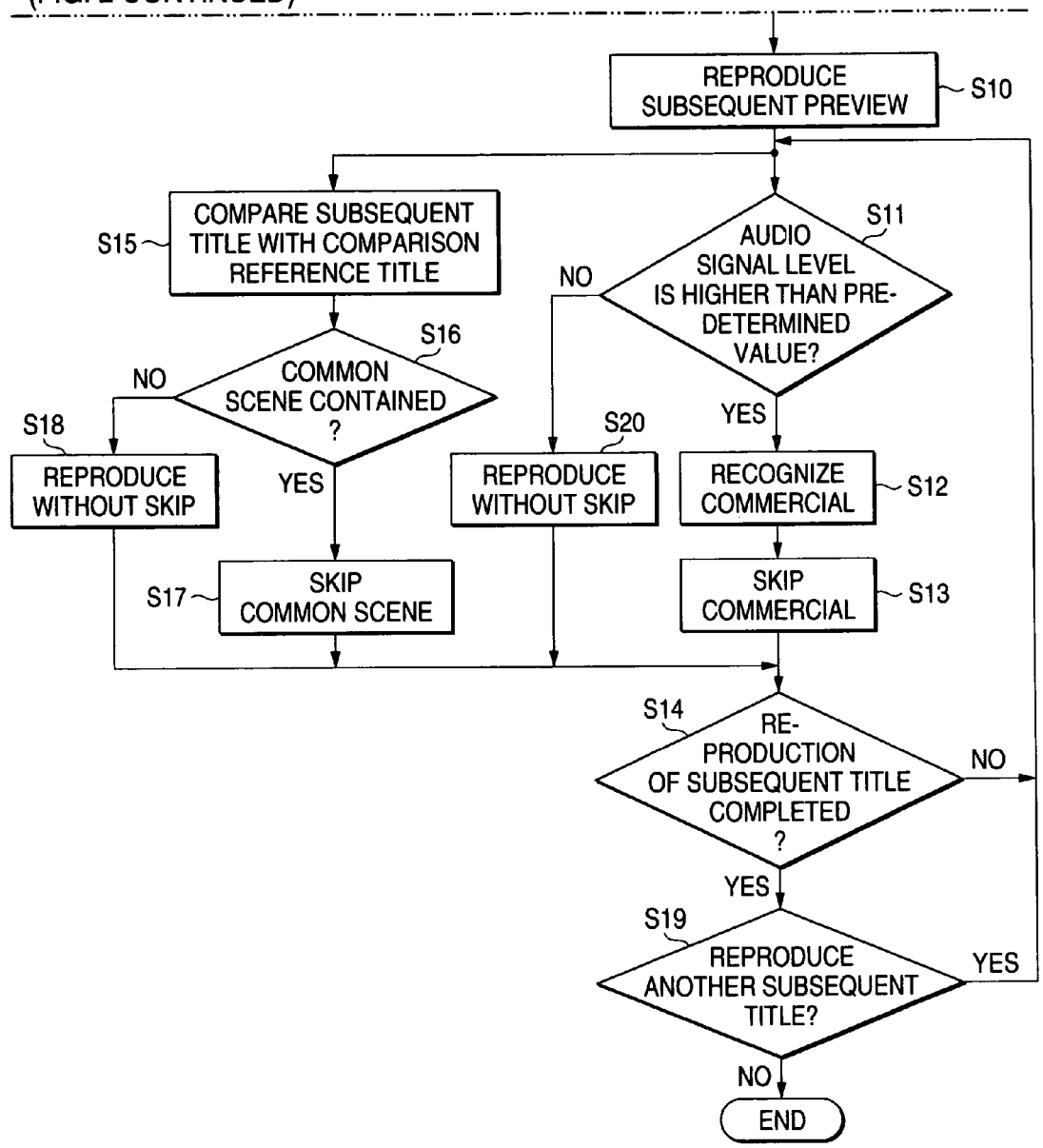

OPTICAL DISK APPARATUS

BACKGROUND OF THE INVENTION

1. Field of the Invention

The present invention relates to an optical disk apparatus for recording and/or reproducing information on an optical disk, or for reproducing information recorded on an optical disk. More particularly, the invention relates to an optical disk apparatus which has a function of displaying and reproducing previews on a display device for respective titles or chapters of information recorded on an optical disk.

2. Background Art

Currently, a DVD (digital versatile disk) as an optical disk having a high recording density has been increasingly used as a device for recording picture and audio information obtained from TV programs or the like. When certain TV programs are recorded on a DVD, for example, a DVD recorder for recording information on the DVD records the TV programs together with the recording year, month and date when the programs are broadcasted for each title. At the time of reproduction of the DVD, the DVD recorder displays a disk menu screen on a display device, and reproduces the titles or chapters of the DVD on the disk menu screen through small windows (preview windows).

For example, preview windows A, B, C, D, E and F are displayed on a disk menu screen M as illustrated in FIG. 3. The preview window A shows a preview of a title T1. Similarly, the preview windows B, C, D, E and F show previews of title T2, title T3, title T4, title T5, and title T6, respectively. The recording dates of the titles T1, T2, T3, T4, T5 and T6 are Jul. 2, Jul. 8, Jul. 9, Jul. 12, Jul. 18, Jul. 20, all in 2004, respectively.

[Patent Reference No. 1] JP-A-11-184867

[Patent Reference No. 2] JP-A-2001-283570

In a conventional optical disk apparatus such as a DVD recorder and a DVD player, for example, the preview windows A, B, C, D, E and F corresponding to respective titles (or chapters) are shown on the disk menu screen M, and the contents in each title are reproduced from its initial part. However, since most TV programs include commercials, the contents of the titles cannot be easily recognized when commercials are recorded at the top. Even when the program is reproduced from its initial part without commercial break, the same opening pictures such as names of the cast are shown every time the program is reproduced in case of a drama. Thus, the contents of the title in this case are also difficult to be recognized.

In a related art disclosed in Patent Reference No. 1 which uses multiplexed closed caption data as picture signals of movie titles recorded on a DVD or the like, spoken words which are included in a movie are selected as a retrieval key and the movie is instantly reproduced from a target scene using the selected words. However, since this related-art device is not designed to skip commercials and the same scenes, contents of a preview displayed on a disk menu screen are difficult to be recognized.

Another related art disclosed in Patent Reference No. 2 pertains to a media contents management apparatus capable of efficiently deleting desired media contents stored in storage unit, and is not associated with an optical disk apparatus such as a DVD recorder and a DVD player.

Accordingly, it is an object of the invention to provide an optical disk apparatus for overcoming the above problems, which has a function of improving recognizability of previews on a disk menu.

SUMMARY OF THE INVENTION

The invention provides an optical disk apparatus for recording information on an optical disk and/or for reproducing information recorded on an optical disk, wherein previews corresponding to respective titles or chapters of information recorded on an optical disk are displayed and reproduced on a display device. The optical disk apparatus includes: a preview judging unit that determines whether a preview to be reproduced is an initial preview which corresponds to an initial title or chapter based on its recording date; a first audio level judging unit that determines whether an audio signal level contained in the initial preview is higher than a predetermined value during reproduction of the contents of the initial preview if it is determined that the preview to be reproduced is the initial preview which corresponds to the initial title or chapter; a first reproduction control unit that recognizes a commercial from its audio signal level which is higher than the predetermined value according to the judgment and skipping the commercial, and then reproduces the subsequent information; a second audio level judging unit that determines whether an audio signal level contained in the subsequent preview is higher than the predetermined value during reproduction of the contents of the subsequent preview if it is determined that the preview to be reproduced corresponds to not the initial title or chapter but the subsequent title or chapter by the preview judging unit; a second reproduction control unit that recognizes a commercial from its audio signal level which is higher than the predetermined value according to the judgment and skipping the commercial, and then reproduces the subsequent information; a common scene judging unit that determines whether the subsequent title or chapter and the initial title or chapter as a comparison reference have common scenes during reproduction of the subsequent preview based on video signal waveforms or closed caption data; and a third reproduction control unit that skips the common scenes and reproducing the subsequent information if it is judged that the common scenes are contained.

In this configuration, previews corresponding to respective titles or chapters of information recorded on the optical disk are displayed and reproduced on the display device. The preview judging unit determines whether the preview to be reproduced is the initial preview which corresponds to the initial title. The first audio level judging unit determines whether an audio signal level contained in the initial preview is higher than the predetermined value during reproduction of the contents of the initial preview if it is determined that the preview to be reproduced is the initial preview which corresponds to the initial title. The first reproduction control unit recognizes a commercial from its audio signal level which is higher than the predetermined value according to the judgment by the first audio level judging unit and skips the commercial, and then reproduces the subsequent information.

The second audio level judging unit determines whether an audio signal level contained in the subsequent preview is higher than the predetermined value during reproduction of the contents of the subsequent preview if it is determined that the preview to be reproduced corresponds to not the initial title but the subsequent title by the preview judging unit. The second reproduction control unit recognizes a commercial from its audio signal level which is higher than the predetermined value according to the judgment by the second audio level judging unit and skips the commercial, and then reproduces the subsequent information.

The common scene judging unit determines whether the subsequent title and the initial title have common scenes during reproduction of the subsequent preview. The third reproduction control unit skips the common scenes and reproduces the subsequent information if it is judged that the common scenes are contained from their similar video signal waveforms or closed caption data.

In this configuration, the previews corresponding to the respective titles or chapters are shown on the disk menu screen, and the contents of each title or chapter are reproduced from its initial part. Since a commercial is skipped and not reproduced, the contents of the respective titles or chapters are easily recognized. Moreover, even when a title or chapter reproduced from its initial part contains no commercial therein, the contents of the title or chapter are easily recognized since the same opening pictures are skipped and not reproduced. Accordingly, the structure allows the contents of the previews displayed on the disk menu screen to be easily recognized and thus usability of the previews to be enhanced for users.

The invention provides an optical disk apparatus for recording information on an optical disk or for reproducing information recorded on an optical disk, wherein previews corresponding to respective titles or chapters of information recorded on an optical disk are displayed and reproduced on a display device, the apparatus including: a system controller which compares a target title or chapter with a comparison reference title or chapter during reproduction of a preview corresponding to the target title or chapter, and skips common scenes and reproduces subsequent information when the target title or chapter and the comparison reference title or chapter have common scenes.

In this configuration, previews corresponding to respective titles, for example, of information recorded on the optical disk are displayed and reproduced on the display device. The target title is compared with the comparison reference title during reproduction of the target preview. The common scenes are skipped and the subsequent information is reproduced when the common scenes are contained.

In this configuration, the previews corresponding to the respective titles or chapters are shown on the disk menu screen, and the contents of each title or chapter are reproduced from its initial part. Since a commercial is skipped and not reproduced, the contents of the respective titles chapters are easily recognized. Moreover, even when a title or chapter reproduced from its initial part contains no commercial therein, the contents of the title or chapter are easily recognized since the same opening pictures are skipped and not reproduced. Accordingly, the structure allows the contents of the previews displayed on the disk menu screen to be easily recognized and thus usability of the previews to be enhanced for users.

According to the invention, the system controller recognizes a commercial from its audio signal level which is higher than the predetermined value according to the judgment during reproduction of the contents of the preview and skipping the commercial, and then reproduces the subsequent information. Thus, the contents of each title or chapter are reproduced from its initial part while the commercial is being skipped. As a result, the contents of the title or chapter are easily recognized.

According to the invention, whether the common scenes are contained or not is judged based on video signal waveforms or closed caption data. Thus, it is judged that common scenes are contained when the video signal waveforms or closed caption data in the target title are similar to those in the comparison reference title, for example.

According to the invention, the system controller further includes: a preview judging unit that determines whether a preview to be reproduced is an initial preview which corresponds to an initial title or chapter based on its recording date; a first audio level judging unit that determines whether an audio signal level contained in the initial preview is higher than a predetermined value during reproduction of the contents of the initial preview if it is determined that the preview to be reproduced is the initial preview which corresponds to the initial title or chapter; a first reproduction control unit that recognizes a commercial from its audio signal level which is higher than the predetermined value according to the judgment and skipping the commercial, and then reproduces the subsequent information; a second audio level judging unit determines whether an audio signal level contained in the subsequent preview is higher than the predetermined value during reproduction of the contents of the subsequent preview if it is determined that the preview to be reproduced corresponds to not the initial title or chapter but the subsequent title or chapter by the preview judging unit; a second reproduction control unit that recognizes a commercial from its audio signal level which is higher than the predetermined value according to the judgment and skipping the commercial, and then reproduces the subsequent information; a common scene judging unit that determines whether the subsequent title or chapter and the initial title or chapter as a comparison reference have common scenes during reproduction of the subsequent preview based on video signal waveforms or closed caption data; and a third reproduction control unit that skips the common scenes and reproduces the subsequent information if it is judged that the common scenes are contained. In this configuration, the contents of each title or chapter are reproduced from its initial part while a commercial is being skipped and not reproduced. Moreover, even when a title or chapter reproduced from its initial part contains no commercial therein, the contents of the title or chapter are easily recognized since the same opening pictures are skipped and not reproduced.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
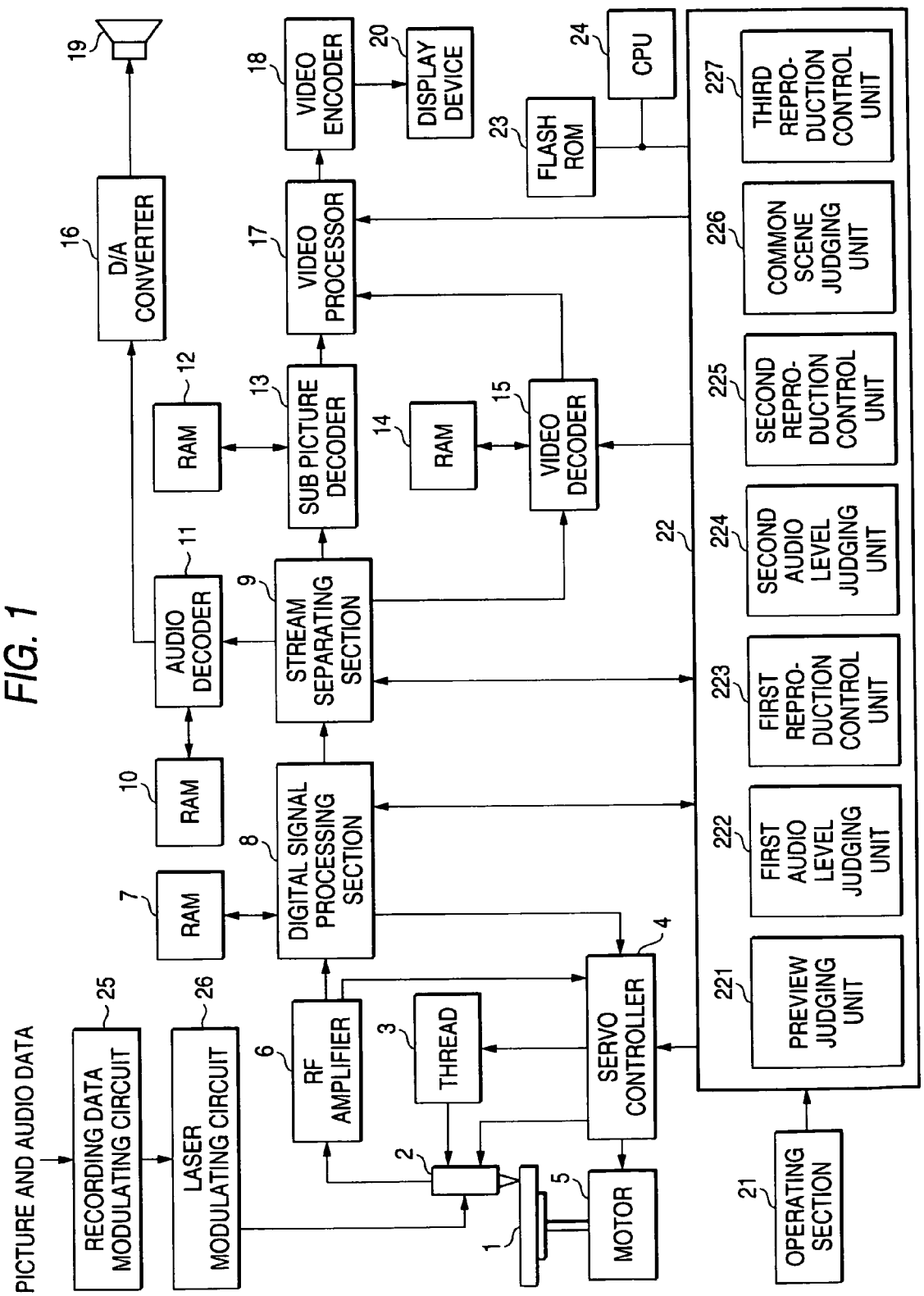
FIG. 1 is a block diagram showing a structure of an optical disk apparatus in an embodiment according to the invention.

An embodiment According to the invention is hereinafter described with reference to the appended drawings. FIG. 1 is a block diagram showing a structure of an optical disk apparatus (optical disk recording and reproducing apparatus such as DVD recorder) in an embodiment according to the invention.

The optical disk apparatus includes: a spindle motor 5 for rotating an optical disk 1; an optical pickup 2 for emitting laser beams used for recording and/or reproducing information on the optical disk 1 and receiving reflected light from the optical disk 1; a thread 3 for shifting the optical pickup 2 in the radial direction of the optical disk 1; and a servo controller 4 for actuating the spindle motor 5 and the thread 3 and shifting the focal positions of the laser beams in the vertical and horizontal directions with respect to the recording surface of the optical disk 1 by moving an objective lens (not shown) accommodated within the optical pickup 2 in accordance with commands from a system controller 22.

The optical disk apparatus further includes: an RF amplifier 6 for amplifying RF signals as reading signals from the optical pickup 2 at the time of reproduction of the optical disk 1; a digital signal processing section 8 for converting the RF signals outputted from the RF amplifier 6 into digital data, and then storing the data in a RAM 7 after the data is signal-demodulated and error-corrected according to the data format of the optical disk 1; and a stream separating section 9 for separating audio data, sub picture data and video data from the data stream outputted from the digital signal processing section 8 according to the commands from the system controller 22.

The optical disk apparatus further includes: an audio decoder 11 for receiving the audio data outputted from the stream separating section 9 and decoding the audio data according to a predetermined decoding process; a RAM 10 for temporarily storing the audio data before decoding the audio data in the audio decoder 11; a sub picture decoder 13 for receiving the sub picture data outputted from the stream separating section 9 and decoding the sub picture data in a predetermined decoding process; a RAM 12 for temporarily storing the sub picture data before decoding the sub picture data in the sub picture decoder 13; and a video decoder 15 for receiving the video data outputted from the stream separating section 9 and decoding the video data according to a predetermined decoding process; and a RAM 14 for temporarily storing the video data before decoding the video data in the video decoder 15.

The optical disk apparatus further includes: a video processor 17 for synthesizing the data outputted from the video decoder 15 and the data outputted from the sub picture decoder 13 in accordance with the commands from the system controller 22; a video encoder 18 for converting the synthesized data outputted from the video processor 17 into video signals for display so that a display device 20 can display images; and a D/A converter 16 for converting the data outputted from the audio decoder 11 into analog audio signals and supplying the analog audio signals to a speaker 19 or the like.

The optical disk apparatus further includes: an operating section 21 having a recording key for sending record commands, a reproducing key for sending reproduction commands, a stop key for sending recording and reproducing stop commands, and other various operation keys for sending commands to the system controller 22; and the system controller 22 for controlling the entire apparatus. The operating section 21 may be either a remote controller or an operating section equipped on an operation panel of the apparatus main body.

The optical disk apparatus further includes: a flash ROM 23 in which programs and data for controlling respective components on the apparatus and the entire apparatus are stored; and a CPU 24 for performing arithmetic operation according to the programs and data stored in the flash ROM 23 to control the system controller 22.

The optical disk apparatus further includes: a recording data modulating circuit 25 for modulating picture and audio data transmitted from not-shown television receiver, personal computer or the like to record the picture and audio data on the optical disk 1; and a laser modulating circuit 26 for outputting laser modulating signals to the optical pickup 2. The laser modulating signals are used to modulate the laser beams emitted from the optical pickup 2 in accordance with the data modulated by the recording data modulating circuit 25.

The system controller 22 as a characteristic component in this embodiment, wherein previews corresponding to respective titles or chapters of the information recorded on the optical disk 1 are displayed and reproduced on the display device 20, includes: a preview judging unit 221 for determining whether a preview to be reproduced is the initial preview which corresponds to the initial title or chapter based on its recording date; a first audio level judging unit 222 for determining whether an audio signal level contained in the initial preview is higher than a predetermined value during reproduction of the contents of the initial preview if it is determined that the preview to be reproduced is the initial preview which corresponds to the initial title or chapter; and a first reproduction control unit 223 for recognizing a commercial from its audio signal level which is higher than the predetermined value according to the judgment and skipping the commercial, and then for reproducing the subsequent information.

The system controller 22 further includes: a second audio level judging unit 224 for determining whether an audio signal level contained in the subsequent preview is higher than the predetermined value during reproduction of the contents of the subsequent preview if it is determined that the preview to be reproduced corresponds to not the initial title or chapter but the subsequent title or chapter by the preview judging unit 221; and a second reproduction control unit 225 for recognizing a commercial from its audio signal level which is higher than the predetermined value according to the judgment and skipping the commercial, and then for reproducing the subsequent information.

The system controller 22 further includes: a common scene judging unit 226 for determining whether the subsequent title or chapter and the initial title or chapter as a comparison reference have common scenes during reproduction of the subsequent preview based on video signal waveforms or closed caption data; and a third reproduction control unit 227 for skipping the common scenes and reproducing the subsequent information if it is judged that the common scenes are contained. The closed caption data refers to data as text information equivalent to the audio information which is supplied to those who are hard of hearing, and is displayed in the form of captions at a distal position of the images on the television screen.

Figure 2:
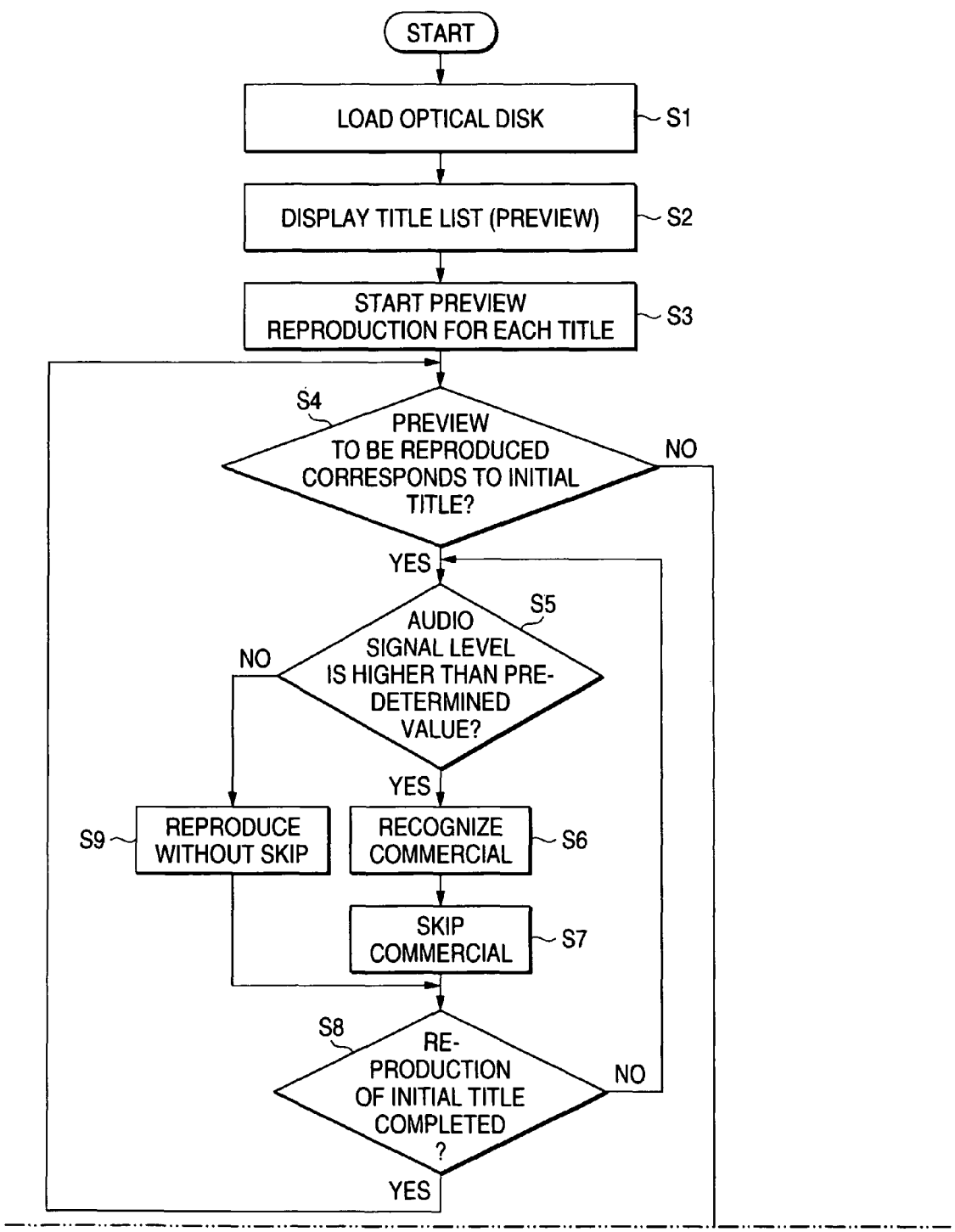
FIG. 2 is a flowchart showing preview reproduction processing performed by the optical disk apparatus in the embodiment.

FIG. 2 is a flowchart showing the preview reproduction processing performed by the optical disk apparatus in this embodiment. The preview reproduction processing executed by the optical disk apparatus according to this embodiment is now explained with reference to this flowchart.

Figure 3:
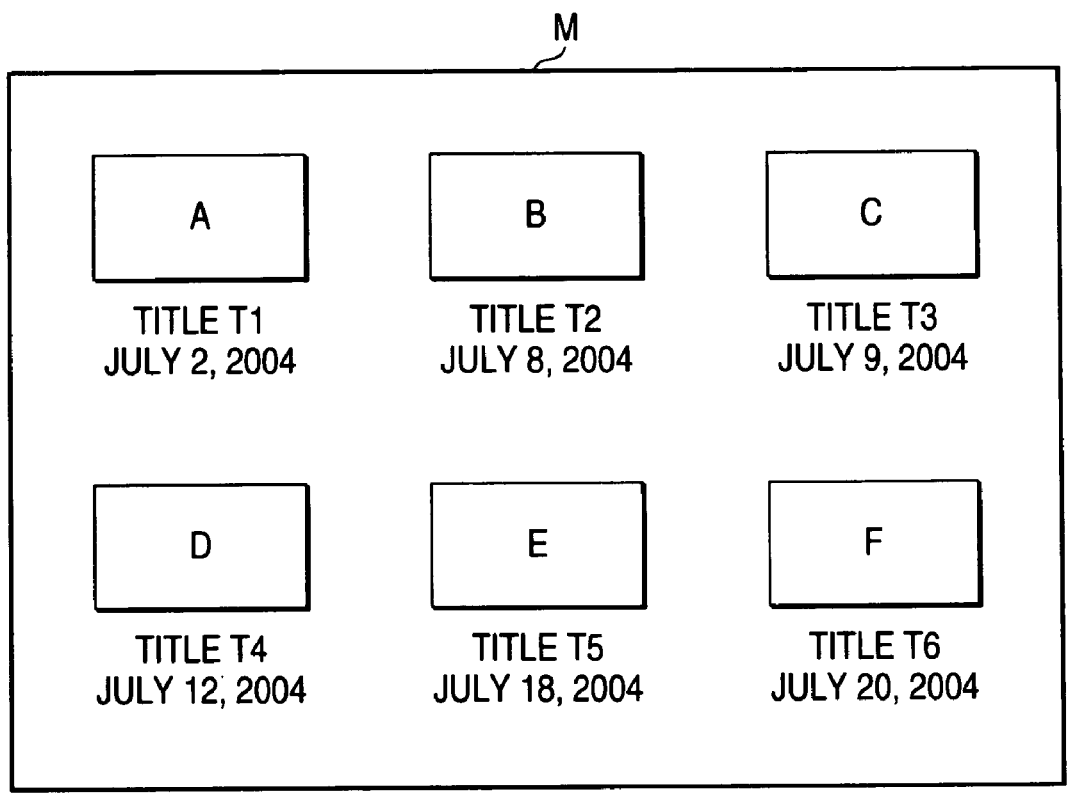
FIG. 3 illustrates a disk menu screen shown by a conventional optical disk apparatus or the optical disk apparatus in the embodiment.

Initially, the optical disk (DVD) 1 is loaded into the optical disk apparatus (step S1) to readout the disk information from the optical disk 1 using the optical pickup 2. The disk information is processed by the RF amplifier 6, the digital signal processing section 8, the stream separating section 9, the sub picture decoder 13, the video decoder 15, the video processor 17, and the video encoder 18, each of which performs operation as described above. Then, a title lest (preview) such as the disk menu screen M shown in FIG. 3 is displayed on the display device 20 (step S2).

Next, the flow goes to the reproduction process for each title (step S3). When previews are displayed and reproduced on the display device 20 for respective titles of the information recorded on the optical disk 1, the preview judging unit 221 of the system controller 22 determines whether the preview to be reproduced corresponds to the initial title based on its recording date (step S4). Since the recording date of the title T1 is Jul. 2, 2004 in FIG. 3, the title T1 is the initial title.

If it is determined that the preview to be reproduced corresponds to the initial title by the preview judging unit 221, the first audio level judging unit 222 of the system controller 22 determines whether an audio signal level contained in the initial preview is higher than a predetermined value based on the audio data obtained from the stream separating section 9 during reproduction of the contents of the preview (step S5). The predetermined value is the audio signal level for ordinary broadcasts other than commercials, and the data of the audio signal level as a comparison reference is stored in the flash ROM 23, for example.

If it is determined that the audio signal level is higher than the predetermined value by the first audio level judging unit 222 and thus judged that the audio signal level in this case is the audio signal level of a commercial (step S6), the first reproduction control unit 223 of the system controller 22 shifts the thread 3 using the servo controller 4 so that the optical pickup 2 can skip the commercial (step S7).

If it is determined that the audio signal level is equal to or lower than the predetermined value and thus no commercial is contained in step S5, the preview is reproduced without skip (step S9). When it is determined that reproduction of the initial tile is completed in step S8, the flow returns to step S4. Since the preview to be reproduced next is not the preview of the initial title, reproduction of the subsequent preview starts (step S10). When the preview corresponding to the title T2 displayed in the preview window B which is located subsequently to the preview of the initial title displayed in the preview window A is selected, for example, the preview of the title T2 is reproduced.

If it is determined that an audio signal level contained in the preview of the title T2 is higher than the predetermined value based on the audio data obtained from the stream separating section 9 by the second audio level judging unit 224 of the system controller 22 during reproduction of the preview of the title T2 (step S11) and thus judged that the audio signal is that of a commercial (step S12), the second reproduction control unit 225 shifts the thread 3 using the servo controller 4 so that the optical pickup 2 can skip the commercial, and then the subsequent information is reproduced (step S13).

During the processes in steps S11, S12 and S13, processes in steps S15, S16, S17 and S18 are simultaneously performed. More specifically, the common scene judging unit 226 of the system controller 22 compares the subsequent title with the initial title or chapter as a comparison reference during reproduction of the subsequent preview (step S15) to determine whether common scenes are contained based on the video signal waveforms or the closed captioned data (step S16).

If it is determined that the video signal waveforms or the closed caption data are similar and thus common scenes are included after the title T2 displayed in the preview window B is compared with the title T1 displayed in the preview window A in FIG. 3, for example, the third reproduction control unit 227 of the system controller 22 shifts the thread 3 using the servo controller 4 so that the optical pickup 2 can skip the common scenes (step S17), and then the subsequent information is reproduced.

When reproduction of the subsequent title is completed after the processes for reproducing the title without skip in step S20, for skipping a commercial in step S17, and for reproducing the title without skip in step S18, the flow ends if no title reproduction is left. When other title or titles to be reproduced still remain (step S19), the flow returns to step S11 and step S15 and the same processes are repeated.

In this embodiment, as described above, previews corresponding to respective titles are shown on the disk menu screen, and the contents of each title are reproduced from its initial part. Since commercials are skipped and not reproduced, the contents of each title are easily recognized. Moreover, even when the title reproduced from its initial part contains no commercial therein, the contents of the title are easily recognized since the same opening pictures are skipped and not reproduced. Accordingly, the structure in this embodiment allows the contents of the previews displayed on the disk menu screen to be easily recognized and thus usability of the previews to be enhanced for users.

In this embodiment, the titles T1, T2, T3, T4, T5 and T6 in FIG. 3 are in the same series of TV programs where the title T1 is the initial title, and common scenes contained in both the initial title T1 as a reference and the subsequent titles T2, T3, T4, T5 and T6 are skipped, for example. However, when the titles T3, T5 and T6 are in the same series of TV programs, for example, the title T3 becomes the comparison reference for the scenes of the titles T5 and T6. In this case, the title T3 is regarded as the initial title and common scenes can be skipped in a similar skipping process.

In this embodiment, previews for respective titles are displayed on the disk menu and reproduced thereon. However, previews for respective chapters can be displayed on the disk menu and reproduced thereon by similar operations. Additionally, while the DVD recorder or the like has been used as the optical disk apparatus in this embodiment, preview reproduction can be similarly executed by similar operations when the optical disk apparatus is a DVD player or the like.

[FIG. 1]
A PICTURE AND AUDIO DATA
3 THREAD
4 SERVO CONTROLLER
5 MOTOR
6 RF AMPLIFIER
8 DIGITAL SIGNAL PROCESSING SECTION
9 STREAM SEPARATING SECTION
11 AUDIO DECODER
13 SUB PICTURE DECODER
15 VIDEO DECODER
16 D/A CONVERTER
17 VIDEO PROCESSOR
18 VIDEO ENCODER
20 DISPLAY DEVICE
21 OPERATING SECTION
22 SYSTEM CONTROLLER
23 FLASH ROM
221 PREVIEW JUDGING UNIT
222 FIRST AUDIO LEVEL JUDGING UNIT
223 FIRST REPRODUCTION CONTROL UNIT
224 SECOND AUDIO LEVEL JUDGING UNIT
225 SECOND REPRODUCTION CONTROL UNIT
226 COMMON SCENE JUDGING UNIT
227 THIRD REPRODUCTION CONTROL UNIT
[FIG. 2]
A START
S1 LOAD OPTICAL DISK
S2 DISPLAY TITLE LIST (PREVIEW)
S3 START PREVIEW REPRODUCTION FOR EACH TITLE
S4 PREVIEW TO BE REPRODUCED CORRESPONDS TO INITIAL TITLE?
S5 AUDIO SIGNAL LEVEL IS HIGHER THAN PREDETERMINED VALUE?
S6 RECOGNIZE COMMERCIAL
S7 SKIP COMMERCIAL
S8 REPRODUCTION OF INITIAL TITLE COMPLETED?
S9 REPRODUCE WITHOUT SKIP
S10 REPRODUCE SUBSEQUENT PREVIEW
S11 AUDIO SIGNAL LEVEL IS HIGHER THAN PREDETERMINED VALUE?

S12 RECOGNIZE COMMERCIAL
S13 SKIP COMMERCIAL
S14 REPRODUCTION OF SUBSEQUENT TITLE COMPLETED?
S15 COMPARE SUBSEQUENT TITLE WITH COMPARISON REFERENCE TITLE
S16 COMMON SCENE CONTAINED?
S17 SKIP COMMON SCENE
S18 REPRODUCE WITHOUT SKIP
S19 REPRODUCE ANOTHER SUBSEQUENT TITLE?
B END
[FIG. 3]
A: TITLE 1
  Jul. 2, 2004
B: TITLE 2
  Jul. 8, 2004
C: TITLE T3
  Jul. 9, 2004
D: TITLE T4
  Jul. 12, 2004
E: TITLE T5
  Jul. 18, 2004
F: TITLE T6
  Jul. 20, 2004

What is claimed is:

1. An optical disk apparatus for reproducing contents recorded on an optical disk, comprising:
a system controller configured to:
cause a display device to display previews of the contents recorded on the optical disk;
compare a first one of the contents with a second one of the contents when the display device is caused to reproduce a first one of the previews corresponding to the first one of the contents;
detect whether the second one of the contents contains a common scene which is commonly included in the first one of the contents; and
cause the display device to reproduce a second one of the previews while not reproducing the common scene in a case where the common scene is detected.

2. The optical disk apparatus according to claim 1, wherein the system controller is configured to:
detect whether a commercial is contained in each of the contents based on an audio signal level; and
cause the display device to reproduce each of the previews while not reproducing the commercial in a case where the commercial is detected.

3. The optical disk apparatus according to claim 1, wherein the system controller is configured to detect the common scenes based on video signal waveform or closed caption data.

4. The optical disk apparatus according to claim 1,
wherein the system controller is configured to determine the first one of the previews to be reproduced, based on recording dates of the contents.

5. An apparatus for reproducing contents recorded on a storage medium, comprising:
a system controller configured to:
cause a display device to display previews of the contents;
compare a first one of the contents with a second one of the contents when the display device is caused to reproduce a first one of the previews corresponding to the first one of the contents;
detect whether the second one of the contents contains a common scene which is commonly included in the first one of the contents: and
cause the display device to reproduce a second one of the previews while not reproducing the common scene in a case where the common scene is detected.

6. The apparatus according to claim 5, wherein the system controller is configured to:
detect whether a commercial is contained in each of the contents based on an audio signal level; and
cause the display device to reproduce each of the previews while not reproducing the commercial in a case where the commercial is detected.

7. The apparatus according to claim 5, wherein the system controller is configured to detect the common scene based on video signal waveform or closed caption data.

8. The apparatus according to claim 5, wherein the system controller is configured to determine the first one of the previews to be reproduced, based on recording dates of the contents.

* * * * *